United States Statutory Invention Registration [19]

[11] Reg. Number: H985

Christopulos

[43] Published: Nov. 5, 1991

[54] CELL COMPARTMENT FOR BATTERY MATRIX

[75] Inventor: John A. Christopulos, Oakhurst, N.J.

[73] Assignee: The United States of America as represented by the Secretary of the Army, Washington, D.C.

[21] Appl. No.: 589,147

[22] Filed: Sep. 25, 1990

[51] Int. Cl.[5] ..... H01M 2/10; H01M 14/00

[52] U.S. Cl. ..... 429/99; 429/7

[58] Field of Search ..... 429/1, 7, 99, 100, 61, 429/62

[56] References Cited

U.S. PATENT DOCUMENTS

| | | | |
|---|---|---|---|
| 2,624,033 | 12/1952 | Jacquier | 429/7 X |
| 4,011,366 | 3/1977 | Bones et al. | 429/61 |
| 4,205,121 | 5/1980 | Naitoh | 429/99 |
| 4,315,364 | 2/1982 | Leffingwell | 429/7 X |
| 4,555,451 | 11/1985 | Harrod et al. | 429/1 |
| 4,741,979 | 5/1988 | Faust et al. | 429/62 X |
| 4,806,440 | 2/1989 | Hahs et al. | 429/99 |
| 4,973,532 | 11/1990 | Taskier et al. | 429/62 |

*Primary Examiner*—John S. Maples
*Assistant Examiner*—Shean C. Wu
*Attorney, Agent, or Firm*—Michael Zelenka; William H. Anderson

[57] ABSTRACT

The invention disclosed herein is a battery cell compartment which is useful in limiting the number of batteries in any battery cell matrix. The battery cell compartment permits the use of relatively few batteries for practically any power need. The battery cell compartment essentially comprises a housing for a plurality of battery cells; a door panel; a series of concentric springs attached to the door panel and positioned such that when the door panel is secured to the housing the concentric springs are aligned with battery cell berths in the housing; circuit power pins electrically connected to the concentric springs; a diode, a thermal fuse and a current fuse placed in series with the circuit power pins.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CELL COMPARTMENT FOR BATTERY MATRIX

GOVERNMENT INTEREST

The invention described herein may be manufactured, used and licensed by or for the Government of the United States for governmental purposes without the payment to me of any royalties thereon.

FIELD OF THE INVENTION

The present invention relates generally to the technology of battery applications and storage, particularly to a battery cell compartment comprised of a plurality of premolded berths to replace the use of a single larger battery cell, and more particularly to the construction of a battery cell compartment to minimize the number of batteries needed in any battery matrix.

BACKGROUND OF THE INVENTION

With the proliferation of portable power devices, many different types, designs, and shapes of batteries have been manufactured for varying applications. All of these different batteries need to be tested, analyzed and constructed at great cost to the consumer. These costs are especially incurred by those entities that require a great number of power sources. For example, the Department of Defense of the United States uses a myriad of different types of batteries for its portable power sources. Specifically, the Department of the Army uses approximately two hundred and two different types of batteries for varying applications. As a consequence, the Department of Defense experiences logistical problems as well as incurs great cost in supplying so many different types of batteries to its field soldiers and units. The logistic problems of the Army could be resolved by designing a battery cell compartment which uses only eight types of batteries but also fulfills its power requirements for its multitude of device applications.

The battery compartments which have been designed to date have only been designed to ensure the continued proper and safe operation of the portable power source. Generally, these battery compartments keep the battery cells in electrical alignment with each other or provide a means by which the battery cells are physically maintained under extreme conditions. These compartments, however, only provide a place of storage for the batteries and do not facilitate the function or usefulness of the power source.

With the advent of Lithium Thionyl Chloride batteries, it is possible to provide a consistent and relatively large amount of portable power at a comparatively light weight. Placing these batteries in series then may fulfill virtually any portable power need. Therefore, it has become feasible to arrange Lithium Thionyl Chloride battery cells for portable power requirements instead of designing a new type or shape of battery cell.

The present invention is a device by which lithium thionyl chloride battery cells, as well as others, may be arranged to fulfill most portable power requirements.

SUMMARY OF THE INVENTION

One objective of this invention is to provide uniformity to the types of batteries used by an entity with a large battery matrix while not compromising the power output of the battery structure.

Another objective of this invention is to increase the efficiency of use of any battery structure while maintaining the size and power output.

Another object is to make the disposal of batteries more cost effective upon expiration of the battery cells.

Another object is to reduce the number of battery cells needed for any battery matrix.

Another object is to provide a secure compartment for battery storage within a portable power device.

These and other objects are achieved by the present invention which comprises a compartment for a plurality of individual battery cells, a door panel, a means to attach the door panel to the housing, a series of concentric springs which are attached to the door panel and which are arranged in a series circuit, a set of circuit power pins which are attached to the door panel and which are connected in series with the concentric springs, each set of circuit power pins being arranged in series with a diode, and a current fuse, a thermal fuse to cease battery operation when the internal temperature of the device exceeds a predetermined temperature, and a means to connect the circuit power pins to the application device. The individual battery cells are arranged in the compartment such that the positive and negative terminals of the battery cells contact the respective concentric springs when the door panel is secured.

This battery cell compartment may be altered at minimal cost to accommodate any power requirement without the need to design a completely new battery cell for a new or altered application. Therefore, only a few types of batteries would be needed to fulfill any portable power need. This is accomplished by merely adding or subtracting the number of battery cells placed in the compartment in order to accommodate the power requirement. The power output may also be altered by the type of diode used in series with the circuit connector pin. The diodes are used in these circuits to prevent a charging of lithium thionyl chloride battery cells by an external power source. Diodes and thermal fuses, of course, would not be used in battery compartments designed for alkaline cell batteries.

BRIEF DESCRIPTION OF THE DRAWINGS

These and other objects, features, and details of the invention will become apparent in light of the ensuing detailed disclosure, and particularly in light of the drawings wherein.

DETAILED DESCRIPTION

Figure 1:
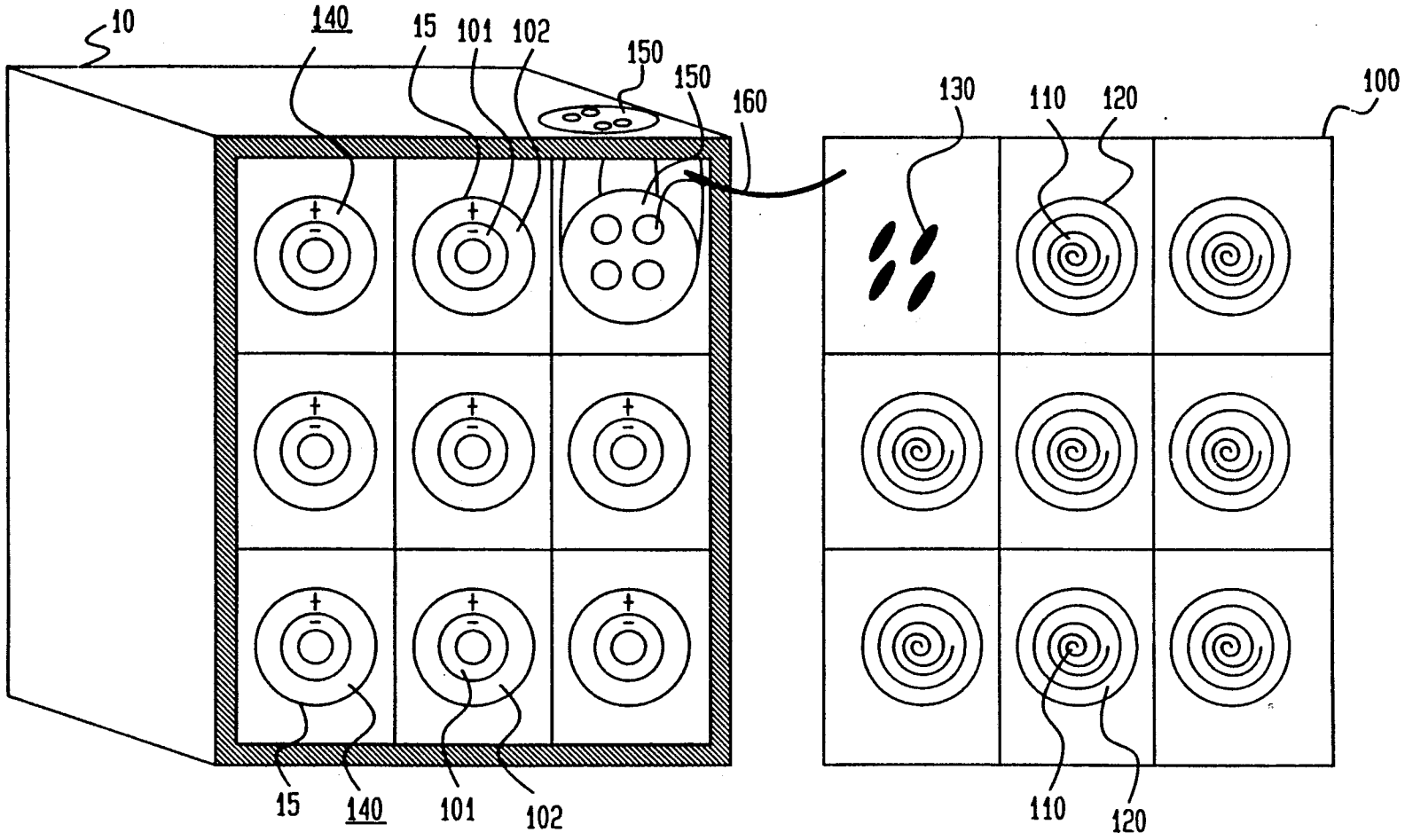
FIG. 1 is a perspective view of the cell matrix in accordance with the present invention.

FIG. 1 is an idealized view of a battery cell compartment in accordance with the present invention. Within the compartment 10 are premolded berths 15 which provide a secure housing for individual battery cells 140. Each berth 15 is preferably molded such that only a particular size or shape of battery will fit into the berth 15. The individual battery cells 140 have both negative and positive terminals 101 and 102 located at one end of the battery cell. This is to ensure that the battery cells 140 are connected correctly so as to prevent the structure from failing to work or to short out.

The battery cells are interconnected electrically by concentric springs 110 and 120 which are attached to a door panel 100 and which contact only the respective terminals 101 and 102 of the battery cells 140 when the door panel 100 is attached to the compartment 10. The concentric springs 110 and 120 are positioned such that concentric spring 110 may only contact the negative terminal 101 and concentric spring 120 may only contact the positive terminal 102.

The concentric springs are placed in series with circuit power pins 130 also attached to the door panel The circuit power pins 130 are fitted into a connector 150 by placing the circuit power pins 130 into apertures 160. The application to be powered by the battery structure is connected to the structure by means of connector 150. A thermal fuse may be incorporated into the structure as lithium thionyl batteries may vent if they attain an internal temperature exceeding 91 degrees Celsius.

The present invention may be constructed so as to accommodate any number of batteries and therefore, the only limitation of the present invention is the size and number of batteries needed for any given application. Excluding this limitation, then, it is estimated that only eight types of batteries would be needed to fulfill any portable power need. Thus, the cost of battery development and procurement will be greatly reduced.

Figure 2:
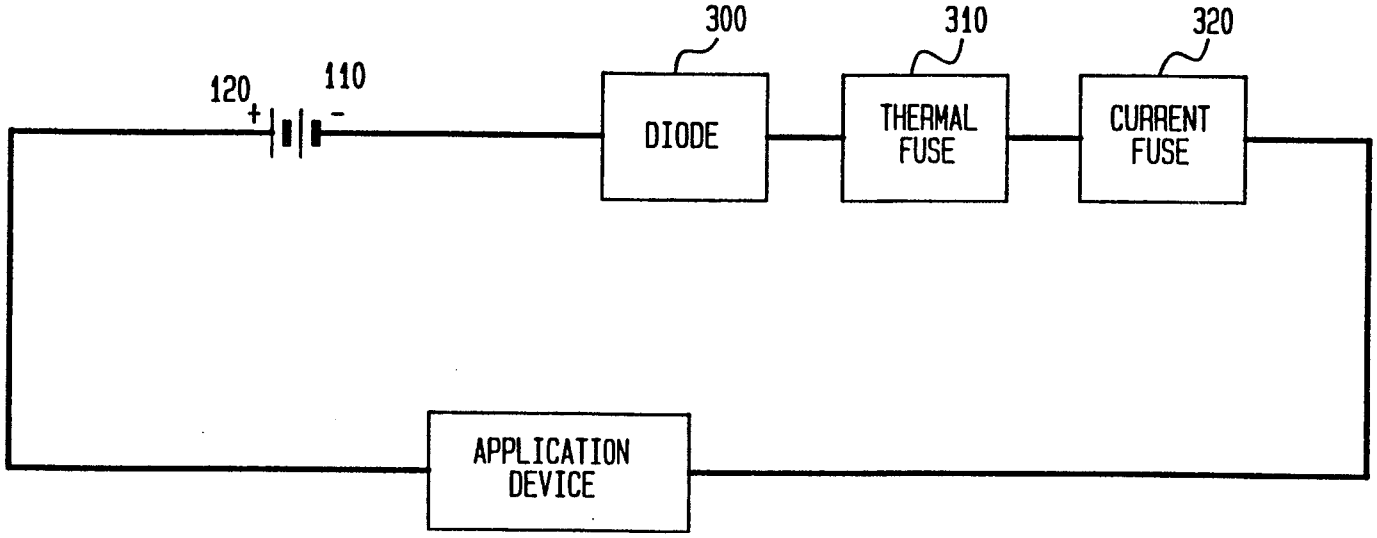
FIG. 2 is a schematic drawing of the electrical circuit in accordance with the present invention.

FIG. 2 is a schematic illustration of the electrical circuitry of the present invention. The individual battery cells are placed in series via the concentric springs 110 and 120 which are, in turn, placed in series with a plurality of diodes 300 and a current fuse 320. The plurality of diodes 300 is necessary to prevent charging of lithium battery cells as well as to act as power inhibitors when a specific power requirement is needed. The current fuse 320 is needed to prevent a current surge from the battery which would otherwise destroy the application device.

Although the preceding description of the present invention illustrates only one embodiment of the invention, other configurations and circuits which embody the present invention are possible. It is therefore considered that the foregoing disclosure relates to a general illustration of the invention and should not be construed in a limiting sense, it being the intent to define the invention by the appended claims.

What is claimed is:

1. A battery cell compartment comprising:

a housing;

a plurality of berths disposed within said housing, each berth having at least one opening;

a door panel;

means to attach said door panel to said housing;

a plurality of electrically connected concentric springs attached to said door panel in a manner such that the concentric springs are aligned with the openings of said berths when said door panel is attached to said housing;

a plurality of circuit power pins attached to said door panel and electrically connected in series to said concentric springs;

a plurality of diodes electrically connected to said circuit power pins;

a current fuse electrically connected said diodes; and means for connecting an application device circuit to said battery cell compartment.

2. The battery cell compartment of claim 1 wherein said berths may only accommodate one shape of battery cell.

3. The battery cell compartment of claim 1 wherein said housing is one molded unit.

4. The battery cell compartment of claim 1 wherein said battery cell compartment is constructed of a material consisting of polycarbonates.

* * * * *